United States Patent [19]

Pickens

[11] 4,353,120
[45] Oct. 5, 1982

[54] LOW-FREQUENCY SOUND SOURCE FOR TOWED ARRAY CONDITION APPRAISER SYSTEM (TACAS)

[75] Inventor: George O. Pickens, San Diego, Calif.

[73] Assignee: The United States of America as represented by the Secretary of the Navy, Washington, D.C.

[21] Appl. No.: 250,523

[22] Filed: Apr. 2, 1981

[51] Int. Cl.³ .......................................... H04R 29/00
[52] U.S. Cl. ...................................... 367/13; 367/142
[58] Field of Search ................. 367/13, 141, 142, 143

[56] References Cited

U.S. PATENT DOCUMENTS

| | | | |
|---|---|---|---|
| 2,715,331 | 8/1955 | Yates | 73/1 |
| 2,762,447 | 9/1956 | Cady | 181/5 |
| 2,970,666 | 2/1961 | Smith | 181/5 |
| 3,009,104 | 11/1961 | Brown | 324/68 |
| 3,224,246 | 12/1965 | Schloss | 73/1 |
| 3,246,289 | 4/1966 | Mellen | 367/183 |
| 3,659,255 | 4/1972 | Trott | 340/5 |
| 3,864,664 | 2/1975 | Trott | 340/5 |
| 3,895,687 | 7/1975 | McLaughlin | 181/120 |
| 4,030,063 | 6/1977 | Wallen | 340/8 |
| 4,131,178 | 12/1978 | Bouyoucos | 181/120 |
| 4,160,228 | 7/1979 | Hix | 340/7 |
| 4,202,425 | 5/1980 | Hambrick | 181/120 |
| 4,223,397 | 9/1980 | Bakewell | 367/13 |

Primary Examiner—Richard A. Farley
Attorney, Agent, or Firm—Robert F. Beers; Ervin F. Johnston; Thomas Glenn Keough

[57] ABSTRACT

An improvement for an apparatus for calibrating or otherwise determining the low frequency operational parameters of an elongate hose-like array is compact enough to be mounted on a cart-like member which is free to travel the length of the array. The improvement is in the form of a pair of oppositely extending tubes each having a reciprocating element for ensonifying selective portions of the elongate array with low frequency energy. Having the reciprocating elements 180° moving out of phase with respect to one another to exhibit mirror image excursions and at least one flexible radiating surface proximately located to the array assures that performance compromising vibrations are nullified and that low frequency energy is responsively received by the individual transducer elements along the array's length.

11 Claims, 3 Drawing Figures

LOW-FREQUENCY SOUND SOURCE FOR TOWED ARRAY CONDITION APPRAISER SYSTEM (TACAS)

STATEMENT OF GOVERNMENT INTEREST

The invention described herein may be manufactured and used by or for the Government of the United States of America for governmental purposes without the payment of any royalties thereon of therefor.

CROSS-REFERENCE TO RELATED INVENTIONS

This invention is related to U.S. Patent and Trademark Office U.S. Pat. No. 4,290,123 entitled "Towed Array Condition Appraisal System" by George O. Pickens.

BACKGROUND OF THE INVENTION

This invention relates to the field of devices for determining the characteristics of acoustic transducers. More particularly it concerns an apparatus for performing an in situ determination of the operational parameters of an elongate hose-like acoustic array. In still greater particularity the improved apparatus for enabling the determination of operational characteristics employs a movable cart-like structure that positions a compact, low-frequency source at desired test points along the array's length, or, alternately, the array is pulled through the cart-like structure at a uniform speed as a sound source incorporated in the cart ensonifies the passing hydrophone elements.

Increasingly, the gathering of acoustical data from the oceans is becoming more significant in terms of research and from military considerations. Long line arrays made up of acoustic channels, each monitoring the pressure field through one or generally a number of hydrophone elements arranged in series along the array over a length extending hundreds of feet are able to provide data for highly sophisticated processors. Usually such hydrophone arrays are coupled to a towing vessel or are otherwise vertically or horizontally disposed in the open ocean so that the individual hydrophone elements can provide indications of the acoustic happenings about them. Properly phased and controlled, the hydrophones create steerable beams for determining bearings from acoustic sources or can be otherwise controlled to provide desired responses.

However, the meaningful processing of the received information requires that the operating characteristics of the individual hydrophones or groups of hydrophones forming the front end of acoustic channels in the elongate array be known or at least predictable. As a consequence the calibration must occur frequently enough to ensure that the array undetected degredations to not occur, particularly since the array operates in the harsh marine environment which oftentimes adversely affects everything near it.

Over the years a variety of techniques have been developed for calibrating individual hydrophone elements of a large array. One approach distantly projects calibration or test signals of selected frequencies and magnitudes on the arry so that it is received nearly simultaneously by every hydrophone element. In a popular calibration technique the sections of an elongate array are coiled on a cylindrical form having an acoustic projector at the center and a standard hydrophone next to the array. This assembly is lowered into a calibration pool for conducting the acoustic tests.

One somewhat more acceptable calibration apparatus and method are disclosed by George O. Pickens in U.S. Patent and Trademark Office U.S. Pat. No. 4,205,394. This device encloses coiled sections of the array with a reference hydrophone in a box and creates pressure fields by means of a group of loudspeakers operating in unison and serving as large pistons. While this greatly reduced the cost and risk of damage in array calibration, it failed to make the measurements under operational temperature and pressure envinronments. Largely, because of time constraints and support equipments such a calibration takes place at shore installations periodically between cruises. In the meantime a lot of invalid data would be collected as the hydrophone characteristics change during an actual deployment of the array at sea.

Yet another calibration approach indirectly determines the sensitivity of individual hydrophones by monitoring an acoustic source which is not located near or focused at any individual hydrophone. First the array is deployed and the distance source actuated. The multipath effect quite expectedly interferes with sensitivity measurements. Calibration is compromised and the sensitivity of the individual hydrophones that make up a towed array during operational conditions is indeterminable.

The nearest thing for appraising the condition of a towed array under working conditions is disclosed by George O. Pickens in his U.S. Patent and Trademark Office Ser. No. 126,589. His invention entitled "Towed Array Condition Appraisal System" causes a cart-like neutrally buoyant structure to release its hold on the forward end of an array. The structure essentially stops in the water as the array pulls through an incorporated projector. While this is happening, one of the several functions of this device is to ensonify the passing hydrophones with one or more acoustic signals of chosen frequencies and levels. Meanwhile on-board ship the resultant voltages from the acoustic channels are suitably recorded so that the relative and absolute sensitivities of the individual elements and combined groups can be determined. The restrictions on bulk and weight compounded by the great hydrostatic pressures at the desired operating depths made it difficult or impractical to achieve the necessary sound levels with ceramic projectors at frequencies below 100 Hz. A mechanical projector employing a motor-driven piston seemed to be the answer but the problem was to provide the backing compliance for the piston. In other applications this has been accomplished in two manners, both of which are troubled by great depths and tend to be inefficient. One backs the volume behind the piston with compressed air at or nearly equal to the hydrostatic pressure. The other incorporates a compliant structure which both withstands the hydrostatic pressure and complies with the volumetric displacement of the piston. With the increasing interest in monitoring and analyzing low frequency signals it has become apparent that the calibration apparatus of this system could be improved upon to provide for low frequency calibration.

Thus, there is a continuing need in the state-of-the-art for an improved apparatus having a low-frequency calibrating capability for a long line array of spaced acoustic elements.

SUMMARY OF THE INVENTION

The present invention is directed to providing an improved apparatus for enabling an in situ determination of the operational parameters of an elongate array of spaced acoustic elements on which a longitudinally displaceable member is adapted to travel. A means is mounted on the longitudinally displaceable member for ensonifying the space acoustic elements with acoustic energy in the low frequency range as it moves along the array. The low frequency ensonifying means is provided with one or a pair of oppositely extending tubes with open ends oppositely extending from the array and the opposite ends positioned adjacent to the elongate array. A projector piston is disposed for reciprocal travel in each fluid filled tube to form a dipole projector, each with one end having a source level equal but 180° out of phase with its opposite end to project low frequency acoustic energy.

A prime object of the invention is to provide an improvement for an elongate array calibrator.

Another object of the invention is to provide a long line array calibrator adapted to ensure a lower frequency calibration.

Still another object is to provide a low frequency source suitable for mounting on a longitudinally traveling cart for assuring calibration of the array.

Yet another object is to provide a low frequency source for enabling the determination of operational parameters without introducing mechanical vibrations that might influence the response of the hydrophone elements.

Yet another object of the invention is to provide an improvement for an acoustic array calibrator which allows for low frequency calibration of individual hydrophone elements in the open ocean during operational conditions.

Still another object is to provide a compact, low-cost, low frequency source of uncomplicated design and consequent enhanced reliability.

These and other objects, advantages and novel features of the invention will become apparent from the following detailed description of the invention when considered in conjunction with the accompanying drawings.

DESCRIPTION OF THE PREFERRED EMBODIMENT

The invention generates low frequency acoustic signals in close proximity of the array without the need for causing volumetric changes at the projector and the attending problem of regulating the pressure of an enclosed gas volume. This invention is based on a simple acoustic dipole consisting of a piston which moves back and forth a relatively short distance in a long fluid-filled rigid cylinder; thereby forming acoustic sources at both ends having pressure waves of equal levels but 180° apart in phase angle. While the net field is zero, due to cancellation, at either equal or great distances from the cylinder ends, this peculiar application permits the placing of one end of the dipole several times as far from the ensonified hydrophone element than the other, without requiring a cylinder which is unwieldly. This results in a net pressure field at the hydrophone element which is easily computed, though slightly diminished by the opposing field of the remote end of the dipole. While such a configuration will suffice in some cases, a superior arrangement greatly reduces the mechanical vibration and attendant calibration errors by incorporating a second identical dipole positioned as a mirror image of the first. As the pistons and fluids move inwards and outwards in phase the acceleration forces are balanced and the pressure fields are additive (far ends still 180° off of near ends).

Figure 1:
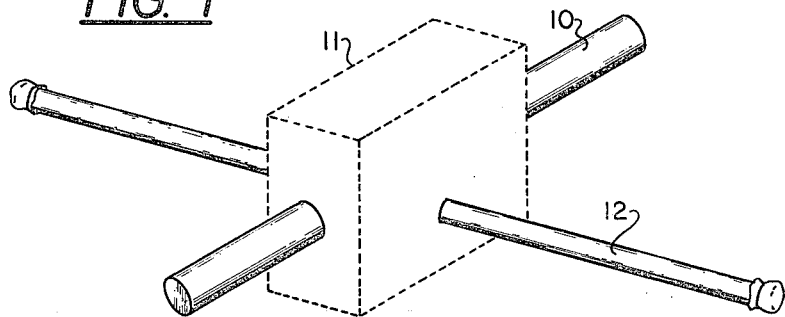
FIG. 1 is an isometric depiction of the invention disposed for travel along an elongate array.

Referring now to FIG. 1 of the drawings, a section of an elongate hydrophone array 10 is operationally disposed in the ocean and a carrying structure or cart 11 supports a sound source 12 of this invention.

Hydrophone arrays of the type referred to are in widespread use. They are generally said to be hose-like in shape and extend for hundreds or thousands of feet. An outer sheath covers a number of spaced hydrophone elements and conductors, fill fluid or dielectric gel, supporting cables, and the like work together to provide signals representative of impinging acoustic energy. These signals are collected and processed for a variety of reasons, yet the responsive use of the information must be based on relative signal strengths, phase angles, and other relationships which are generated by the multiplicity of spaced hydrophone elements.

Calibration or determination of the operational parameters of the individual hydrophone elements has been made possible to a high degree due to the structure and calibration scheme disclosed by George O. Pickens in his co-pending U.S. Pat. application entitled "Towed Array Condition Appraisal System". His system uses a carrier or cart-like device for traversing the length of the array and for ensonifying it with acoustic energy. This invention makes use of the same cart mechanism, yet provides for extended capabilities, for the improved sound source 12 assures low frequency ensonification, in the neighborhood of 20 Hz.

The sound source is adaptable to be carried by the cart mechanism by simple modifications by one skilled in the art to which this invention pertains.

Figure 2:
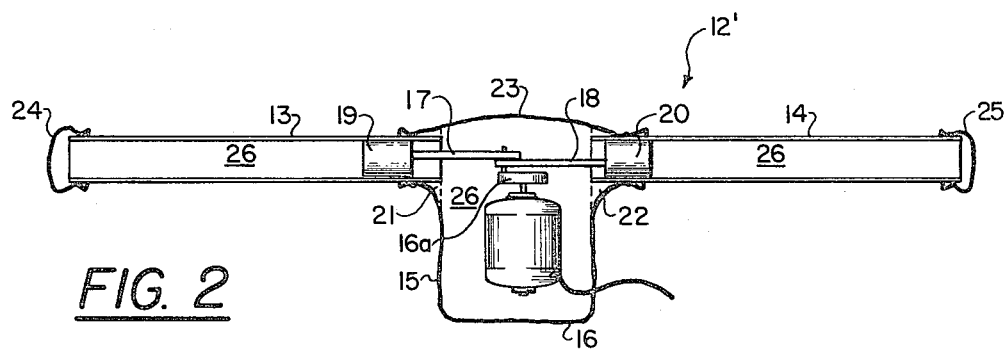
FIG. 2 is a cross-sectional view of one embodiment of the invention.

Referring now to FIG. 2 of the drawings, a sound source 12' has two elongate tubes 13 and 14 which extend in opposite directions from a central housing 15. The shape of the housing itself is not critical to an appreciation of the inventive features of this invention, it simply must be spacious enough to accommodate an electric motor 16, an optional speed reduction gear 16a and a pair of reciprocating linkages such as crank-and-rod mechanisms 17 and 18. The tubes are about 30" long.

The crank-and-rod mechanisms, or, optionally, cam or yokes, serve to translate the rotary motion of the motor into a reciprocal displacement of a pair of opposed pistons 19 and 20. The pistons are sized to fit within tubes 13 and 14 for free reciprocal motion and may be provided with rings, key-ways, or other features for guiding the reciprocal excursion as felt to be necessary.

The housing is coupled to the two tubes by flexible or elastic sleeves 21 and 22 which may extend to include a larger flexible or elastic radiation surface 23. The surface 23 optionally is fashioned to be positioned on opposite sides of the array or in a ring shape to assure an even ensonification. The oppositely facing distant ends of the two tubes are covered by flexible or elastic caps 24 and 25 which enclose the tubes so that a contained dielectric oil 26 fills the tubes and housing to make them insensitive ambient pressure variations.

Optionally, the flexible or elastic caps and for that matter the flexible or elastic innerconnecting sleeves may be omitted. Better long term reliability and predictable characteristics make it desirable to include the caps, sleeves and dielectric oil.

Figure 3:
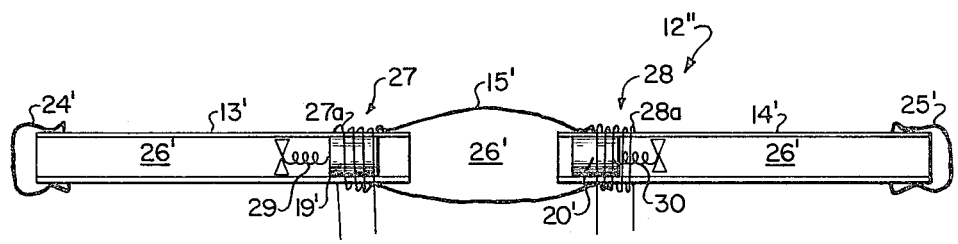
FIG. 3 shows a variation of the invention in cross-section.

A modification appears in FIG. 3 in which a sound source 12" has a pair of oppositely extending tubes 13' and 14'. Flexible or elastic caps 24' and 25' together with a similar flexible or elastic housing section 15' close the interior of the tubes so that an oil or similar fluid 26' fills it entirely.

Linear induction motors 27 and 28 are located to displace pistons 19' and 20' in a manner well established in the art. Let it suffice to say at this point that coil 27a and 28a receive suitable polarity signals to cause the two pistons to converge and diverge as mirror images of one another and springs 29 and 30 return the pistons to a normal position after the driving potentials have been removed. The constants of the springs are selected to match the mass of the piston and entrained fluid for reducing the electrical power drain.

Operation of either embodiment of the disclosed sound sources calls for their being appropriately mounted in the cart mechanism and being moved along the array. Appropriate driving potentials are fed to either the rotary motor 16 or the linear motors 27 and 28 so that the interconnected pistons 19 and 20 or 19' and 20' reciprocate in their tubes. Low frequency sound is projected through the flexible sleeves 21 and 22 and optional flexible surface 23 or flexible housing section 15' which are located near the array. Since the pistons are 180° out of phase a magnified, relatively intense, low acoustic energy signal is transmitted to the hydrophone elements.

The flexible, more distal ends 24 and 25, 24' and 25' also project acoustic energy but since the flexible surfaces 21, 22 and 23 as well as 15' are so much nearer the hydrophone elements, the sound emanating from the more remote projection surfaces is small. This is because the surfaces 21-22-23 and 21'-22' are less than one-tenth the distance from the hydrophone elements as surfaces 24-25 and 24' and 25'. The pressure waves from the closer surfaces are approximately 10 times the pressure waves from the far distant surfaces.

Since the oil or water volume is merely transferred back and forth and the projection surfaces are close to the hydrophone elements, a considerable pressure variation can be created. By having the two pistons traveling in opposite direction, the nearby pressure wave is additive and the mechanical vibrations otherwise attributable to a single such vibrating surface are not created and, therefore, cannot be transmitted to the array. Such vibrations from a single radiating surface could very well be coupled to the array to obscure the desired acoustic results. Therefore, in critical applications it is desirable to have two pistons driven in two tubes that extend in opposite directions perpendicular from the array axis.

A single piston in a single tube will function somewhat satisfactorily if certain precautions are followed. Suitable damping must be provided including bungie-like mounts, resilient couplers, counterweights and the like.

Since the tubes and motors can be filled with a non-corrosive fluid such as an oil, and rubber or otherwise suitable flexible, elastic materials can be used to contain the oil, the sound source should be relatively trouble free. The gear box 16a between the motor and the crank-and-rod mechanisms 17 and 18 of FIG. 2 might be advisable to sustain low frequency operation for prolonged periods of time; however it is well to remember that low motor speeds and reduced frictional losses may be more desirable.

Although linear induction motors and return springs and the crank-and-rod piston actuators have been discussed, it is well within the scope of this inventive concept to embrace cams and followers along with appropriate springs to responsively reciprocate the pistons. The multitude of cams, followers and related contrivances for providing linear displacements are well known and further elaboration is felt unnecessary.

Obviously many modifications and variations of the present invention are possible in the light of the above teachings. It is therefore to be understood that within the scope of the appended claims the invention may be practiced otherwise than as specifically described.

I claim:

1. In an apparatus for enabling an in situ determination of operational parameters of an elongate array of spaced acoustic elements covered by a hose-like sheath on which a longitudinally displaceable member is adapted to travel, an improvement therefor is provided comprising:

means mounted on the longitudinally displaceable member for ensonifying the spaced acoustic elements with acoustic energy in the low frequency range as it moves along the array, the low frequency ensonifying means is provided with first and second tubes each having one open end extending outwardly from the array and the other open end positioned adjacent the elongate array and a projector of acoustic energy is disposed in each tube to ensonify the spaced acoustic elements with low frequency acoustic energy.

2. An improved apparatus according to claim 1 in which the low frequency ensonifying means has the first tube extending outwardly from the axis of the array and the second tube extending outwardly in the opposite direction as the first tube and each tube has its own projector of acoustic energy.

3. An improved apparatus according to claim 2 further including:

means coupled to both of the acoustic energy projectors for reciprocating them in the low frequency range, one hundred eighty degrees out of phase with respect to each other to exhibit mirror-image excursions.

4. An improved apparatus according to claim 3 in which the projectors are a pair of pistons both connected to a rotary motor via reciprocating linkages to create low frequency range signals.

5. An improved apparatus according to claim 4 further including:

flexible closures covering the open ends of the first and second tubes.

6. An improved apparatus according to claim 5 further including:

an oil filling the interior of the first and second tubes.

7. An improved apparatus according to claim 6 further including:

a speed reduction gear mechanism connected between the rotary motor and the reciprocating linkages to assure very low frequency range signals.

8. An improved apparatus according to claim 3 in which the projectors are a pair of pistons each having a coil mounted on a tube and disposed for electromagnetic coaction and reciprocation of the pistons when appropriate driving potentials are applied thereto.

9. An improved apparatus according to claim 8 further including:
compliant closures covering the open ends of the first and second tubes.

10. An improved apparatus according to claim 9 further including:
an oil filling the interior of the first and second tubes.

11. An improved apparatus according to claim 8 further including:
a centering spring coupled to each piston having constants to mechanically resonate with the masses of the piston and a fluid filling each of the tubes to reduce the electrical power requirements.

* * * * *